US009904294B2

(12) United States Patent
Guidetti et al.

(10) Patent No.: US 9,904,294 B2
(45) Date of Patent: Feb. 27, 2018

(54) CONTROL VALVE

(71) Applicant: FIMCIM S.P.A., Milan (IT)

(72) Inventors: Tiziano Guidetti, Milan (IT); Alfredo Cerutti, Milan (IT); Stefano Crivelli, Milan (IT)

(73) Assignee: FIMCIM S.P.A., Milan (IT)

( * ) Notice: Subject to any disclaimer, the term of this patent is extended or adjusted under 35 U.S.C. 154(b) by 204 days.

(21) Appl. No.: 14/898,451

(22) PCT Filed: Jun. 10, 2014

(86) PCT No.: PCT/IB2014/062109
§ 371 (c)(1),
(2) Date: Jan. 13, 2016

(87) PCT Pub. No.: WO2014/199302
PCT Pub. Date: Dec. 18, 2014

(65) Prior Publication Data

US 2016/0139605 A1    May 19, 2016

(30) Foreign Application Priority Data

Jun. 13, 2013  (IT) .............................. MI2013A0973

(51) Int. Cl.
*G05D 7/00* (2006.01)
*F16K 3/26* (2006.01)
(Continued)

(52) U.S. Cl.
CPC .............. *G05D 7/00* (2013.01); *F16K 3/262* (2013.01); *F16K 5/04* (2013.01); *F24D 19/1015* (2013.01);
(Continued)

(58) Field of Classification Search
CPC ........... Y10T 137/7792; Y10T 137/782; Y10T 137/7791; Y10T 137/7788;
(Continued)

(56) References Cited

U.S. PATENT DOCUMENTS 4,774,984 A * 10/1988 Peters ................... F16K 47/045
137/625.32
4,809,949 A *  3/1989 Rakieski ................ F16K 5/061
137/382

(Continued)

FOREIGN PATENT DOCUMENTS

| AT | 413 435    | 2/2006  |
| WO | 2005038315 | 4/2005  |
| WO | 2009/135490 | 11/2009 |

OTHER PUBLICATIONS

International Search Report and Written Opinion dated Mar. 2, 2015 in PCT/IB2014/062109, twelve pages.

*Primary Examiner* — Matthew W Jellett
(74) *Attorney, Agent, or Firm* — Nixon & Vanderhye P.C.

(57) ABSTRACT

A control valve including: a valve body, a flow shutter operatively interposed between an inlet and an outlet, a driving spindle having at least a first actuating end and a second end connected to the flow shutter. The valve also includes a differential pressure automatic regulation device, comprising: a cup-shaped body arranged around the driving spindle and axially mobile with respect to said driving spindle; a spring operatively interposed between the valve body and the cup-shaped body to push the latter away from the flow shutter; a rolling membrane having a radially inner edge fixed to the cup-shaped body and a radially outer edge fixed to the valve body to delimit a first chamber in fluid communication with the inlet and a second chamber in fluid communication with the outlet.

20 Claims, 9 Drawing Sheets

(51) Int. Cl.
 *F16K 5/04* (2006.01)
 *G05D 7/01* (2006.01)
 *F24D 19/10* (2006.01)

(52) U.S. Cl.
 CPC ... *G05D 7/0106* (2013.01); *F24D 2220/0271* (2013.01)

(58) Field of Classification Search
 CPC ......... Y10T 137/7787; Y10T 137/8733; Y10T 137/7793; Y10T 137/7797; Y10T 137/87917; Y10T 137/7809; Y10T 137/7824; Y10T 137/87378; Y10T 137/7782; G05D 7/0106; F24D 19/1015; F24D 19/1036
 USPC ............... 251/63.6, 127, 215, 286, 287, 296
 See application file for complete search history.

(56) References Cited

U.S. PATENT DOCUMENTS

| | | | | |
|---|---|---|---|---|
| 5,775,369 | A * | 7/1998 | Hagmann | G05D 7/0106 137/501 |
| 7,789,105 | B2 * | 9/2010 | Zecchi | F16K 47/08 137/625.33 |
| 8,322,359 | B2 * | 12/2012 | Zecchi | G05D 16/0647 137/15.18 |
| 8,469,052 | B2 * | 6/2013 | Jorgensen | G05D 7/0106 137/495 |
| 9,383,033 | B2 * | 7/2016 | Pettinaroli | F24D 19/1036 |
| 9,651,953 | B2 * | 5/2017 | Essfeld | G05D 7/014 |

\* cited by examiner

CONTROL VALVE

RELATED APPLICATIONS

This application is the U.S. national phase of International Application No. PCT/IB2014/062109 filed Jun. 10, 2014, which designated the U.S. and claims priority to Italian Patent Application MI2013A000973 filed Jun. 13, 2013, the entire contents of each of these applications are hereby incorporated by reference.

TECHNICAL FIELD

The present invention relates to a control valve. In particular, the present invention relates to a valve capable of guaranteeing a constant flow automatically, independently of any fluctuations in pressure upstream or downstream of the valve itself. Said valves are preferably used in heating systems also of highly different dimensions, such as central heating systems in residential units or district heating systems capable of supplying heat to entire districts and/or small towns, and/or cooling systems.

STATE OF THE ART

Control valves provided with membrane sensitive elements are known which, on the basis of a differential pressure signal, regulate a passing port so as to maintain the differential pressure and the flow rate substantially constant as the incoming or outgoing pressure varies.

Said valve type is described, for example, in document EP 2 338 093 (WO 2009/135490) and comprises a device adapted to maintain a constant differential pressure between an inlet and an outlet and a device for control of the flow rate controlled by means of a pin connected to an actuator. The differential pressure device comprises a rolling membrane and a throttling element capable of placing itself in equilibrium under the action of the incoming pressure, the outgoing pressure and the force of a spring. The device for control of the flow rate comprises an inner cylindrical shell and an outer cylindrical shell provided with respective openings. Control of the flow rate is implemented through the rotation of one shell with respect to the other such as to vary a delimited passage between the openings of said shells. Reduction of the flow rate is achieved by means of the joint axial movement of the cylindrical shells.

Public document AT413435 illustrates a flow regulation device comprising a rotating type butterfly valve.

Document WO 2005/038315 is also known, which illustrates a regulation insert for valves for control of the flow of liquid in heating or conditioning systems. The insert comprises a cup-shaped portion provided with an inlet opening and an outlet opening wherein the outlet opening is closed in response to the differential pressure by means of the insert and under the influence of a spring.

OBJECT OF THE INVENTION

The Applicant has observed that the valves of the prior art equipped with automatic regulation and flow rate control, such as the one described in document EP 2 338 093, are structurally highly complex and for this reason also very expensive and cumbersome, precisely because they comprise various moving parts dedicated to the respective functions.

The Applicant has also observed that said complexity impacts negatively on regularity of the flow which passes through it, since the liquid must necessarily transit in tortuous conduits and/or flow over structural elements, such as springs, with variable geometry or the configuration of which is not constant in all valve operating conditions.

In this field, the Applicant has therefore perceived the need to propose a control valve which:
 presents a simpler and more linear structure than those of the prior art;
 is more compact than the known valves;
 guarantees greater cleaning and regularity of the flow passing through it;
 allows the flow rate to be set and controlled precisely;
 ensures a fine and rapid automatic regulation of the differential pressure and/or the flow rate.

SUMMARY OF THE INVENTION

The Applicant has found that said objectives may be obtained by means of a control valve wherein the arrangement of the elements comprising it is such that circulation of the liquid passing through it occurs in conduits, chambers and hollow spaces which are close to a central driving spindle and along directions which are mainly parallel to said spindle.

More specifically, according to one aspect, the present invention relates to a control valve, comprising:
a valve body having an inlet and an outlet;
a flow shutter operatively interposed between the inlet and the outlet;
a driving spindle having a first actuating end and a second end opposite the first end and connected to the flow shutter, wherein the driving spindle develops along a principal axis;
a differential pressure automatic regulation device, comprising:
a cup-shaped body around the driving spindle and axially mobile with respect to said driving spindle;
a spring operatively interposed between the valve body and the cup-shaped body to push said cup-shaped body away from the flow shutter;
a rolling membrane having a radially inner edge fixed to the cup-shaped body and a radially outer edge fixed to the valve body so as to delimit a first chamber in fluid communication with the inlet and a second chamber in fluid communication with the outlet.

Preferably, the flow shutter has at least one inlet opening facing the inlet of the valve body and at least one outlet opening facing the cup-shaped body.

Preferably, the valve comprises a shutter mounted around the driving spindle and facing the outlet opening of the flow shutter.

Preferably, the flow from the inlet enters the inlet opening of the shutter along a substantially radial direction and exits through the outlet opening of said shutter along a substantially axial direction to then transit towards the outlet of the valve along a substantially radial direction.

The Applicant has verified, in the first place, that the arrangement of the valve components according to what is described above and/or as claimed allows the necessary passages for the fluid to be obtained with a simple and compact structure.

The Applicant has also verified that the valve according to the invention guarantees greater cleaning and regularity of the flow which passes through it.

The Applicant has also verified that the valve according to the invention allows the flow rate to be set and controlled with precision.

In conclusion, the Applicant has also verified that the valve according to the invention ensures a fine and rapid automatic regulation of the differential pressure and/or the flow rate.

The present invention can also have one or more of the preferred characteristics that are described herein below.

Preferably, the valve comprises a guide shaft having an axial passage for the driving spindle, wherein the cup-shaped body is mounted around said guide shaft. In this manner, the axial movement of the cup-shaped body, governed automatically by the differential pressure which acts on the rolling membrane and on the cup-shaped body and by the spring which acts directly on said cup-shaped body, is not influenced by any axial movement of the driving spindle, since said two elements are decoupled from the interposed guide shaft. Said solution allows drastic reduction of the transients caused by dragging which the driving spindle exerts on valves of the known type, such as the one described in EP 2 338 093, on the respective cup-shaped body.

Preferably, the driving spindle may slide axially in the guide shaft. The guide shaft therefore performs its function as axial guide for the driving spindle inside it.

Preferably, the cup-shaped body may slide axially on the guide shaft. Therefore, the guide shaft performs its function as axial guide for the cup-shaped body which slides around it.

Preferably, the guide shaft is fixed with respect to the valve body. More preferably, the guide shaft is an integral part of the valve body. Adopting this solution, the axial movement of the cup-shaped body is not influenced by the movement of other elements apart from the rolling membrane and the spring.

Preferably, the spring is arranged around the cup-shaped body. The position of the spring is such as to reduce its dimensions to a minimum and it contributes to limiting the overall dimensions of the valve.

Preferably, a portion of the second chamber is delimited between a radially outer surface of the cup-shaped body and a radially inner surface of the valve body.

Preferably, the spring is arranged in said portion of the second chamber. The second chamber is therefore also used to house the spring.

Preferably, in at least one operating condition of the open valve, the flow shutter and the shutter delimit between them an annular chamber communicating laterally with the outlet of the valve body. The principal flow of the liquid exits axially from the flow shutter, flows in the annular chamber and exits through the outlet in a substantially radial direction.

Preferably, the spring is axially offset with respect to the annular chamber. More preferably, the second chamber which contains the spring is axially offset with respect to the annular chamber and in fluid communication with said annular chamber. The principal flow of the liquid is therefore not affected by the presence of the spring. More generally, the liquid transits advantageously without encountering elements with variable geometry, like the spring, which would influence the flow differently as a function of its instantaneous configuration and would be subjected to undesired fluid-dynamic loads.

Preferably, the valve body has a cylindrical housing for the flow shutter. Preferably, the valve body has an outlet port between the annular chamber and the outlet. Preferably, the cup-shaped body, with its own axial motion, shuts said outlet port. Preferably, the cylindrical housing has a striking edge adapted to receive in abutment a terminal edge of the cup-shaped body so as to shut off the outlet port of the valve body. Preferably, the cylindrical housing has a striking edge adapted to receive in abutment, in a closed valve condition, a peripheral edge of the shutter. Advantageously, on the same striking edge both the shutter, in a radially more inner position, and the cup-shaped body, in a radially more outer position, engage.

Preferably, in a closed valve condition, the shutter substantially blocks the outgoing flow from the outlet opening of the shutter which it faces. Preferably, the shutter cooperates with the cylindrical housing of the valve body to close the outlet opening of the flow shutter.

Preferably, the shutter is at least partially housed in the cup-shaped body. Preferably, the cup-shaped body has a cylindrical wall radially outside of the shutter and sliding mobile on said shutter. This geometry, which uses the inner volume of the cup-shaped body to house the shutter, contributes to limiting the overall dimensions of the valve.

Preferably, the shutter closes an inner volume of the cup-shaped body and between the radially outer cylindrical wall of the cup-shaped body and the shutter a circular split is delimited which allows the fluid to pass into said inner volume in order to exert a pressure (downstream or outlet pressure) substantially equal to the pressure in the second chamber and in contrast with the pressure in the first chamber (upstream or inlet pressure).

Preferably, the shutter is solidly constrained to the driving spindle in the rotation motion. Preferably, the shutter is solidly constrained to the driving spindle in the axial movement. Preferably, the flow shutter is solidly constrained to the driving spindle in the rotation motion. Preferably, the flow shutter is solidly constrained to the driving spindle in the axial movement. The driving mechanism is extremely simple, since the driving spindle moves solidly with the flow shutter and/or with the shutter.

Preferably, the axial distance between the shutter and the flow shutter is fixed and they delimit between them a substantially toroidal volume which, when the valve is open and therefore the shutter is distanced from the striking edge of the cylindrical housing, it defines the aforesaid annular chamber and is in the same axial position as the outlet port of the valve body. When the valve is closed, on the other hand, said substantially toroidal volume is inserted in the cylindrical housing and is isolated from the outlet of the valve body.

Preferably, the valve body has an inlet port between the inlet and the flow shutter. Preferably, the inlet port is a slot and is realised directly on the valve body between the inlet and the flow shutter. The inlet slot in the cylindrical housing of the valve body allows the elements of the valve to be reduced, since other walls between the valve body and the flow shutter to change the cross-section of the flow passage into said flow shutter are not necessary.

Preferably, the flow shutter is rotatable in the valve body on action of the driving spindle to change the position of its inlet opening with respect to the inlet slot and to change a cross-section of the flow passage. Said regulation is preferably performed manually and serves to pre-set a reference flow rate.

Preferably, the flow shutter is axially mobile in the valve body on action of the driving spindle to change the position of its inlet opening with respect to the inlet port and to change a cross-section of the flow passage. Said regulation is preferably motorised and serves to modulate the flow rate from a maximum value equal to the pre-set reference flow rate to zero, as a function of the thermal requirements of the environment to be heated or cooled.

Preferably, the inlet opening of the flow shutter has a plurality of windows with calibrated cross-section with mainly axial development. In a different embodiment, the inlet opening of the flow shutter has a single window with calibrated cross-section with mainly axial development.

Preferably, said windows are slits which are parallel to the principal axis.

Rotation of the flow shutter allows choice of the number of windows and/or the cross-section of passage facing the inlet slot of the valve body. Axial translation of the flow shutter allows regulation of the area of the already facing windows.

In a different embodiment, said windows are slits which are inclined with respect to the principal axis, so as to obtain a flow shutter with linear characteristics both in rotation and in translation (there is the same percentage variation between the flow coefficient and the flow shutter position).

In a different embodiment, said windows are shaped to obtain an equal-percentage characteristic both in rotation and in translation (the same percentage variation of the flow coefficient on the previous value corresponds with equal variations on absolute value of the position). Preferably, said windows have areas which are different from each other. Preferably, at least some of said windows each have a substantially arrow-shaped outline.

Preferably, the flow shutter comprises a radially outer cylindrical wall, a radially inner cylindrical wall and an annular-shaped base wall which connects said cylindrical walls. The radially outer cylindrical wall, the radially inner cylindrical wall and the base wall delimit an inner volume which leads into an annular outlet opening placed in an axially opposite position to the base wall.

Preferably, the flow shutter comprises a single wide opening covered by a sheet or band in which said windows are afforded. Preferably, said windows are obtained in the sheet or band by means of photo-engraving and/or laser. Preferably, the sheet or band is applied to the single wide opening after affording the windows. This solution allows windows with even highly complex outlines to be afforded in the sheet, since it may be worked flat, and then the sheet may be applied to the flow shutter.

Preferably, the flow shutter has a rotation limiter cooperating with the valve body. Preferably, the rotation limiter is an appendage of the flow shutter inserted in a small chamber afforded in the valve body. The non-circular shaped wall of the small chamber allows limited rotation of the appendage. The rotation limiter serves to delimit the positions which correspond with the minimum and the maximum possible regulations.

Preferably, the driving spindle has an axial conduit adapted to place the inlet in fluid communication with the first chamber. Preferably, a channel afforded in the valve body connects the inlet with a small chamber located in the flow shutter and into which the axial conduit leads. Preferably, the driving spindle has radial passages in fluid communication with the axial conduit and leading onto its own radially outer surface. Preferably, the guide shaft has radial passages adapted to place the radial passages of the driving spindle in fluid communication with the first chamber. Preferably, the radial passages of the guide shaft communicate with a hollow space delimited between the guide shaft and the cup-shaped body in turn communicating with the first chamber. The pressure of the incoming fluid is thus transmitted to the first chamber which is placed in an axially opposite position with respect to the flow shutter.

Preferably, the valve comprises a principal spring interposed between the driving spindle and the valve body to maintain the valve open in the absence of forces applied on the first end of the driving spindle.

Preferably, the valve comprises an actuator which is operatively active on the first end of the driving spindle. Preferably, the actuator moves the driving spindle and the flow shutter axially. Preferably, the valve comprises a regulating ring nut mounted at the first end of the driving spindle to set manually the angular position of the flow shutter. The actuator allows modulation of the flow rate from a maximum value equal to the reference flow rate pre-set with the ring nut to zero (shutter closed).

Preferably, the valve comprises a first pressure intake in fluid communication with the inlet and a second pressure intake in fluid communication with the outlet. Preferably, the pressure intakes are arranged on opposite sides of the actuator. Preferably, the pressure intakes are inclined with respect to the principal axis.

In a different embodiment, they are alongside and parallel to each other and also preferably parallel to the principal axis and/or perpendicular to the direction of flow along which the inlet and outlet are aligned. Preferably, the pressure intakes are placed on the opposite side to the actuator with respect to the direction along which the inlet and outlet are aligned.

Further characteristics and advantages of a preferred, but not exclusive, embodiment of a control valve according to the present invention will appear more clearly from the detailed description.

BRIEF DESCRIPTION OF THE DRAWINGS

This description will be explained below with reference to the attached drawings, provided solely for indicative and therefore non-limiting purposes, in which.

DETAILED DESCRIPTION OF A PREFERRED EMBODIMENT OF THE INVENTION

Figure 1:
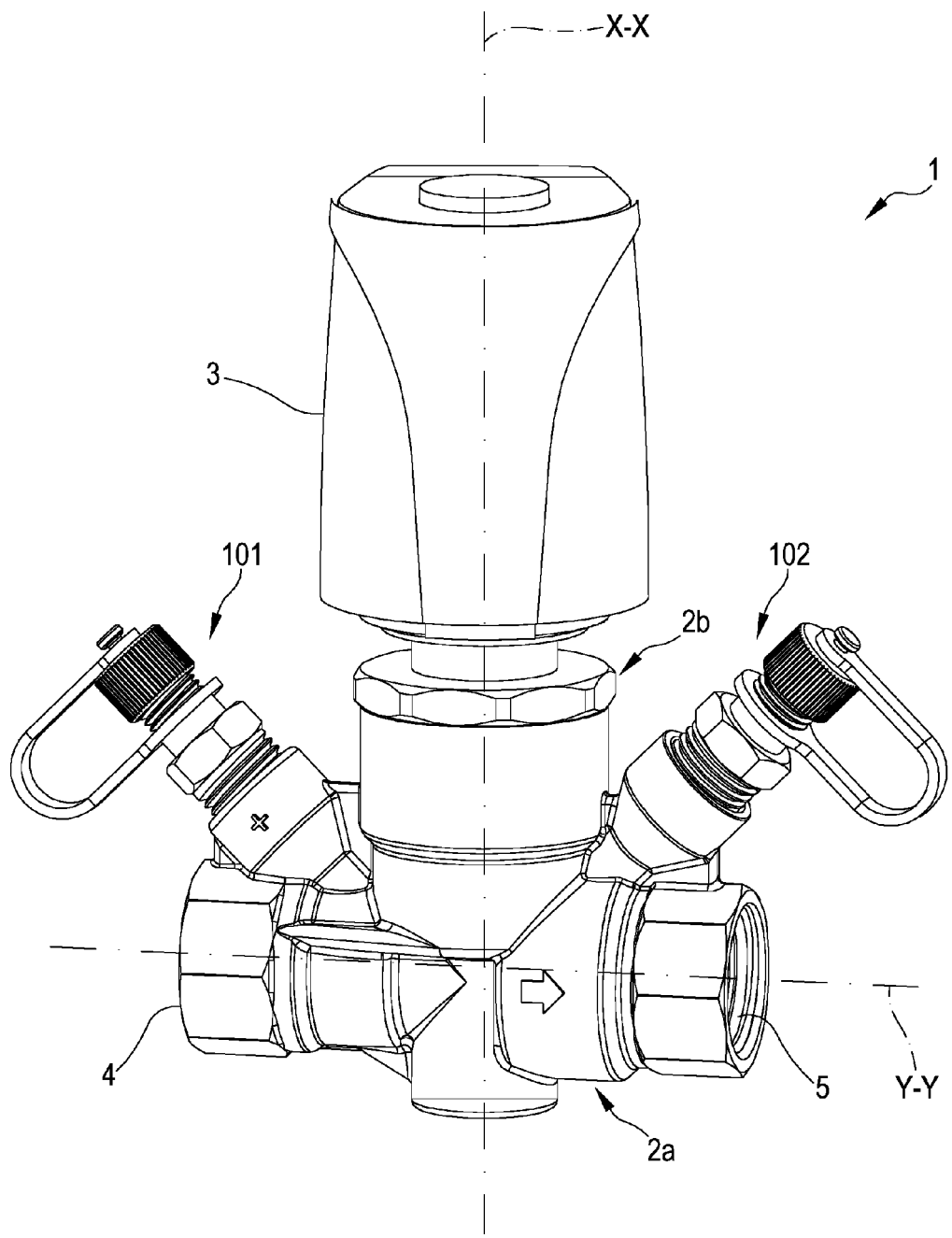
FIG. 1 shows an overall perspective view of the control valve according to the present invention.

With reference to FIG. 1, the number 1 denotes in its entirety a control valve comprising a valve body 2 and an actuator 3 mounted on the valve body 2. The valve body 2 has an inlet 4 and an outlet 5 for flow of a liquid. Said inlet 4 and outlet 5 are threaded internally for connection to respective pipe ends.

Figure 2:
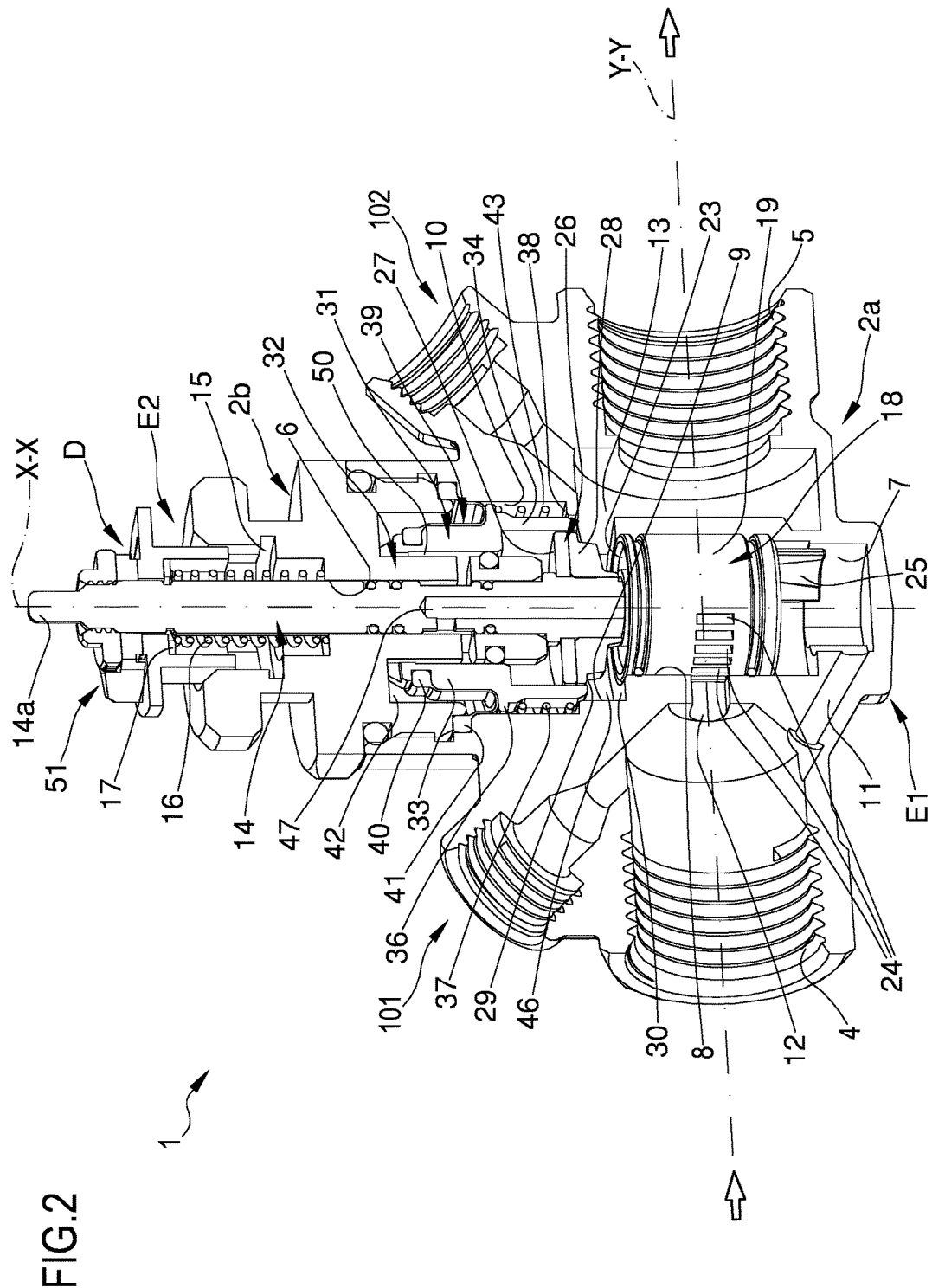
FIG. 2 shows a cross-section view of the valve of FIG. 1, with several parts removed and in an operating configuration.
Figure 4:
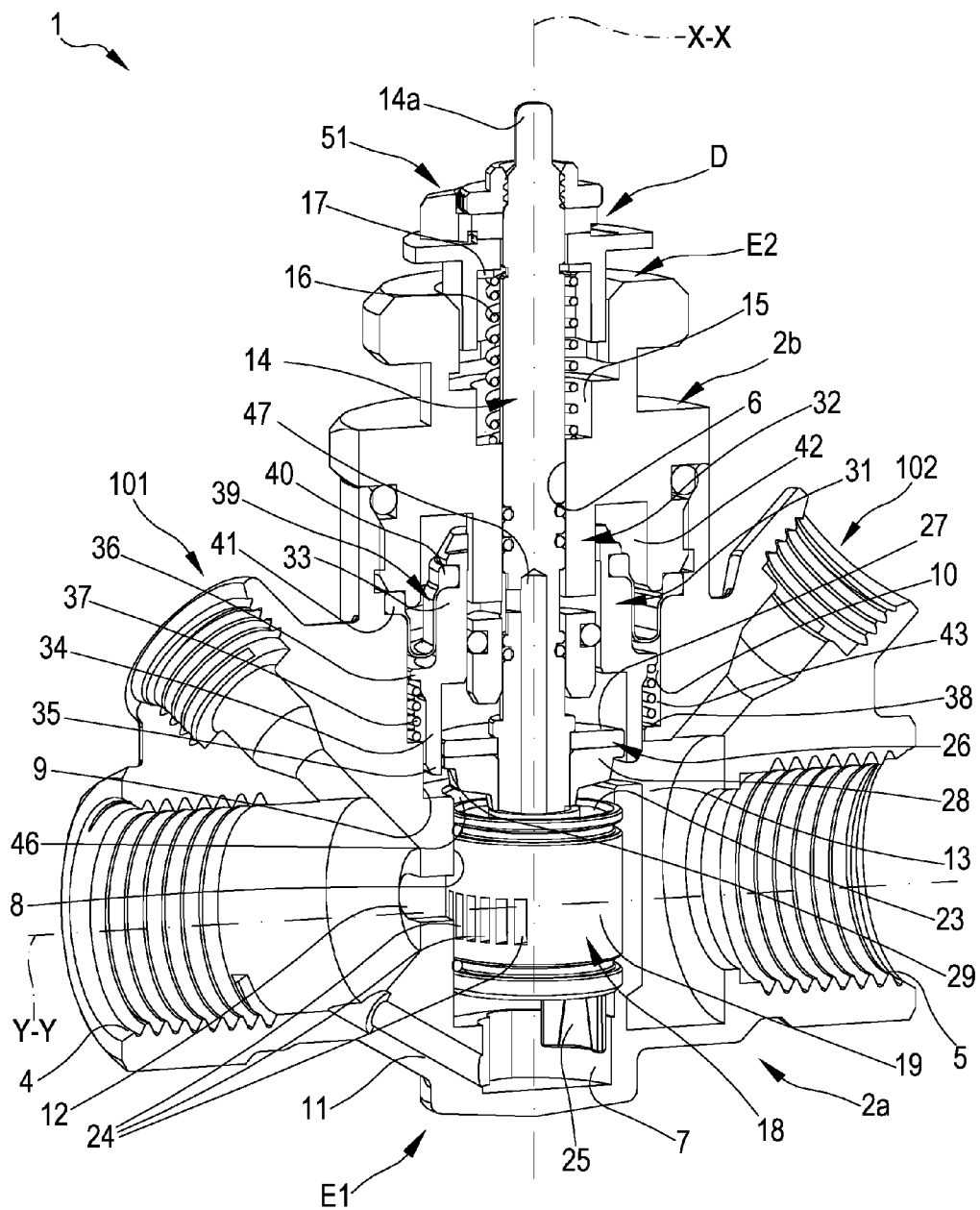
FIG. 4 shows the valve of FIG. 2 in a different operating configuration.
Figure 5:
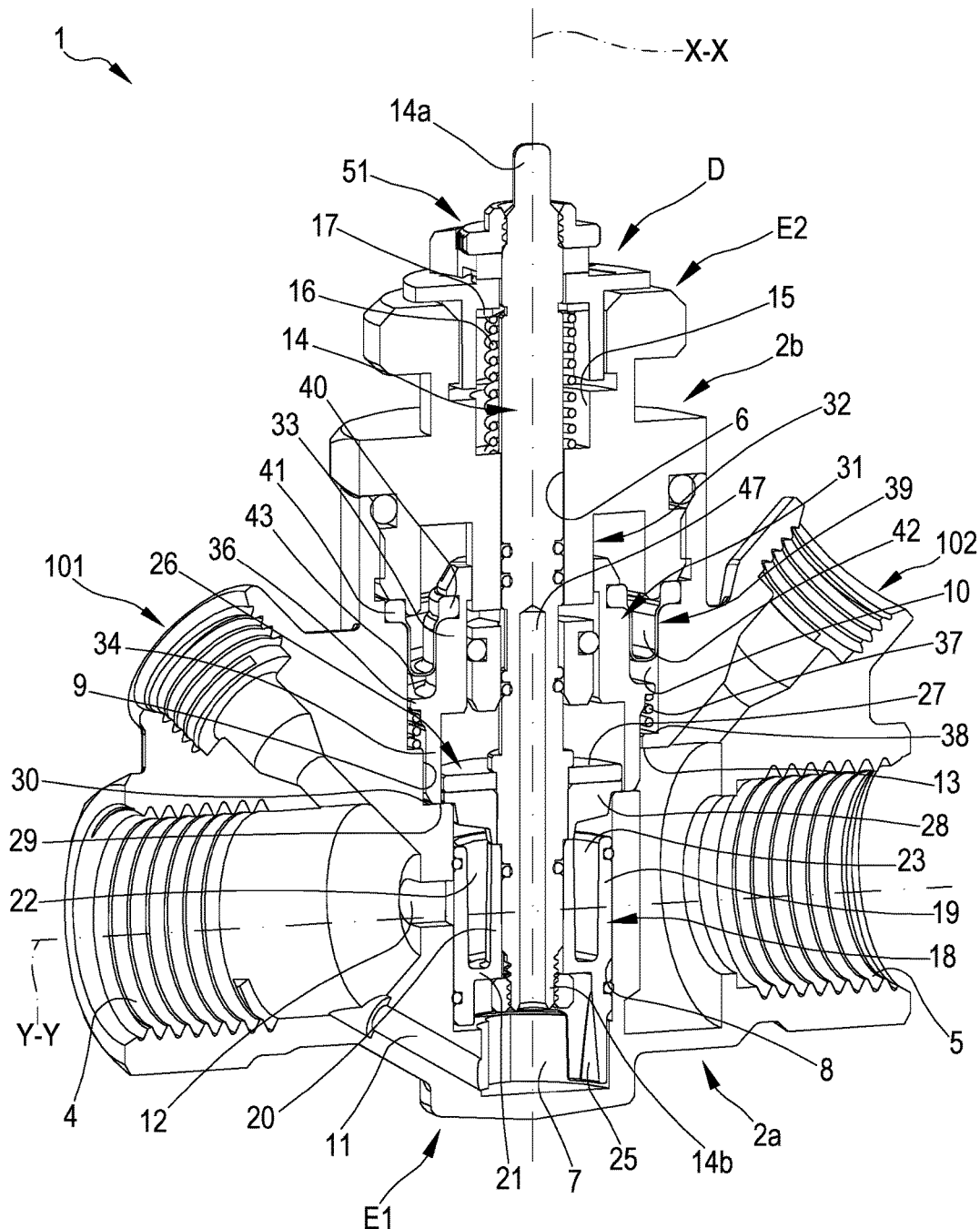
FIG. 5 shows the valve of FIG. 2 in a further different operating configuration.

As visible in FIGS. 2, 4 and 5, the valve body 2 has a principal body 2a afforded in a single piece and having said inlet 4 and said outlet 5 aligned along a flow direction "Y-Y". The valve body 2 comprises an auxiliary body 2b screwed onto the principal body 2a and having an axial passage 6 which develops along a principal axis "X-X". The principal body 2a of the valve body 2 delimits internally, in addition to the inlet 4 and to the outlet 5, a substantially cylindrical cavity which develops along said principal axis "X-X" and is formed by several axial cross-sections, as detailed here below. In the embodiment shown, the principal axis "X-X" is perpendicular to the flow direction "Y-Y". In variants not shown, the angle delimited between said principal axis "X-X" and the flow direction "Y-Y" may be different to 90°.

The valve body 2 also has pressure intakes 101, 102 for housing and/or connection with appropriate pressure sensors and/or differential pressure gauges. A first pressure intake is in fluid communication with the inlet 4 and a second pressure intake is in fluid communication with the outlet 5. Said intakes 101, 102 are inclined with respect to the principal axis "X-X" and also with respect to the flow direction "Y-Y" and are placed on opposite sides of the auxiliary body 2b and the actuator 3.

Starting from a first axial end "E1" of the valve body 2 opposite the auxiliary body 2b and moving towards a second axial end "E2" at said auxiliary body 2b, the substantially cylindrical cavity has a first section 7, a second section 8 of higher radial dimensions to the first section 7, a third section 9 of higher radial dimensions to the second section 8 and a fourth section 10 of higher radial dimensions to the third section 9.

The first section 7 defines a small chamber connected to the inlet 4 through a straight channel 11 afforded in the principal body 2a. The second section 8 defines a cylindrical housing placed between the inlet 4 and the outlet 5 and in direct communication with the inlet 4 through an inlet slot 12 afforded in a wall of the valve body 2 which delimits said cylindrical housing. The inlet slot 12 has an elongated development along a circumferential direction. The third section 9 and the fourth section 10 define together a cylindrical seat. The third section 9 also has an outlet port 13 which communicates directly with the outlet 5 of the valve body 2. A driving spindle 14 is inserted in the axial passage 6 of the auxiliary body 2b and develops in said substantially cylindrical cavity of the principal body 2 towards the first axial end "E1". A first actuating end 14a of the driving spindle 14 projects from the auxiliary body 2b and a second end 14b of said driving spindle 14, opposite the first end 14a, is placed inside the cylindrical housing 8 and facing the small chamber 7 (FIGS. 3 and 5).

Inside the auxiliary body 2b and around the driving spindle 14 is delimited a volume 15 containing a principal spring 16 of helical type which surrounds the driving spindle 14.

The principal spring 16 has an end in abutment against an annular surface of the auxiliary body 2b and an opposite end in abutment against a ring 17 axially solid with the driving spindle 14 and, for this purpose, partially inserted in an annular cavity afforded at the first end 14a of the driving spindle 14. The first end 14a is also coupled to an actuating group "D" engaged by the actuator 3. The principal spring 16 elastically pushes the driving spindle 14 away from the first axial end "E1" of the valve body 2.

Figure 3:
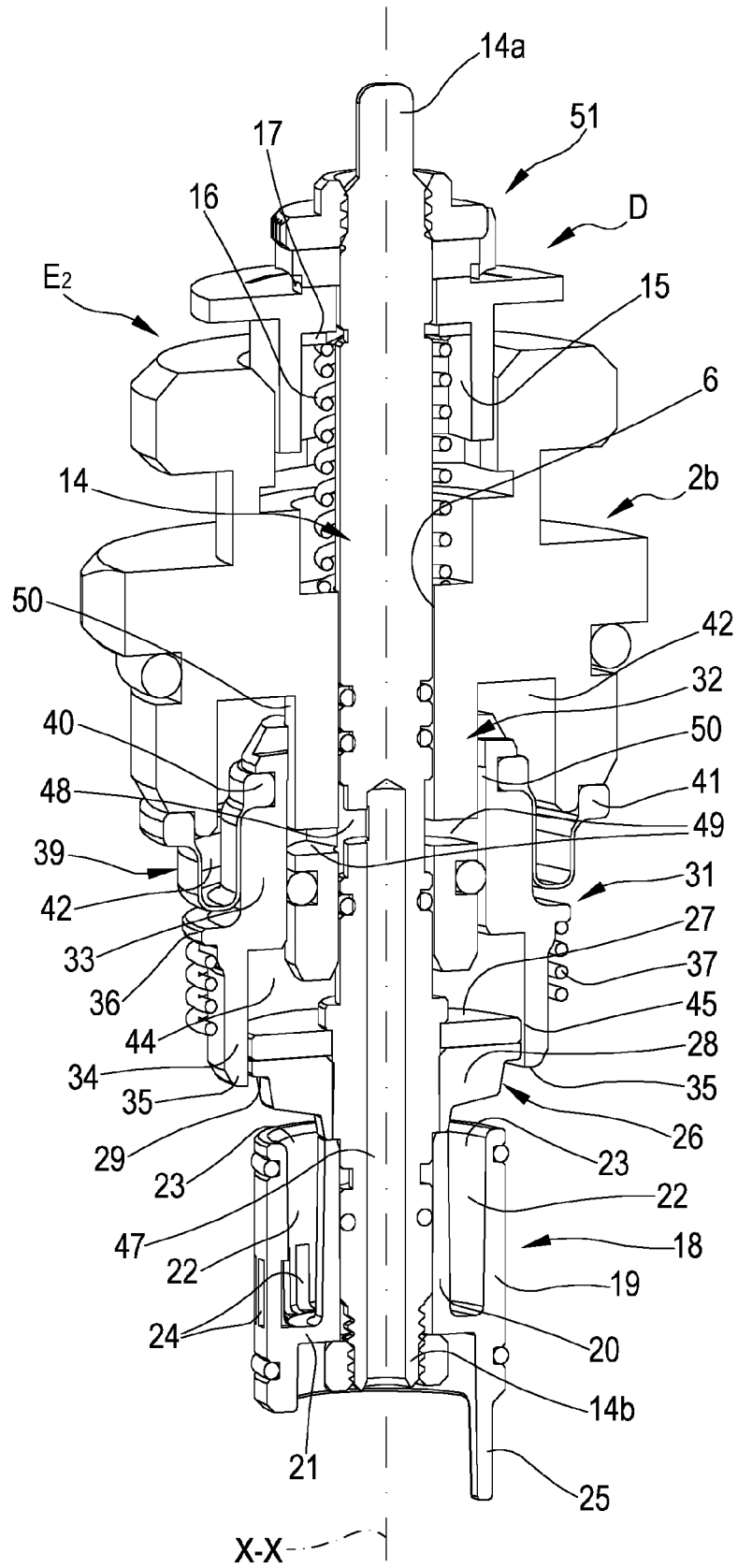
FIG. 3 shows an enlarged and cross-section portion of the valve of FIGS. 1 and 2.

A flow shutter 18 is mounted on the second end 14b of the driving spindle 14 and is housed in the cylindrical housing 8 (FIGS. 3 and 5). The flow shutter 18 comprises a radially outer cylindrical wall 19, a radially inner cylindrical wall 20 and an annular-shaped base wall 21 which connects said cylindrical walls 19, 20. The radially outer cylindrical wall 19, the radially inner cylindrical wall 20 and the base wall 21 delimit an inner volume 22 which leads into an annular outlet opening 23 placed in an axially opposite position to the base wall 21. Through the radially outer cylindrical wall 19 is afforded an inlet opening formed by a plurality of windows 24 reciprocally facing along a circumferential direction and each having a mainly axial development. The radially outer cylindrical wall 19 is placed in contact with the cylindrical housing 8 with interposition of annular seals. The radially inner cylindrical wall 20 surrounds and is placed in contact, with interposition of seals, with the driving spindle 14. The flow shutter 18 is blocked on the driving spindle 14 so as to remain solidly constrained with it in both axial motion and in rotation around the principal axis "X-X". The flow shutter 18 also comprises an appendage 25 which develops axially from a radial edge close to the base wall 21 and remains in the small chamber 7. The appendage 25 interferes with a non-circular shaped wall which delimits the small chamber 7 and acts as a rotation limiter for the flow shutter 18.

A shutter 26 is mounted around the driving spindle 14 and is blocked on the driving spindle 14 so as to remain solidly constrained with it in both axial motion and in rotation around the principal axis "X-X". The shutter 26 comprises a circular plate 27 and a shaped portion 28, preferably in rubber, substantially tapered and associated with the plate 27 and facing the outlet opening 23 of the flow shutter 18. The shutter 26 and the flow shutter 18 are solidly constrained to each other in the axial movement and in the rotation movement. Therefore, the axial distance between the shaped portion 28 of the shutter 26 and the outlet opening 23 of the flow shutter 18 is fixed. In particular, the substantially tapered shaped portion 28 has two successive tapered portions converging towards the driving spindle 14 and towards said outlet opening 23. The shutter 26 and the flow shutter 18 delimit between them a substantially toroidal volume towards which the outlet opening 23 of the flow shutter 18 opens. The shaped portion 28 of the shutter 26 has a radially peripheral edge 29 destined to enter into contact with a striking edge 30 of the cylindrical housing 8 orthogonal to the principal axis "X-X" and defined between the second section 8 and the third section 9 of the substantially cylindrical cavity of the principal body 2a.

A cup-shaped body 31 is mounted around the driving spindle 14 and is axially positioned in the cylindrical seat defined by the third section 9 and the fourth section 10. In greater detail, the cup-shaped body 31 has an axial hole through which passes a guide shaft 32 defined by an inner portion of the auxiliary body 2b. Said axial passage 6 of the auxiliary body 2b is partially afforded in the guide shaft 32 so that said guide shaft 32 remains radially interposed between the driving spindle 14 and the cup-shaped body 31. The cup-shaped body 31 has a first portion 33 with lower radial dimensions coupled sliding to the guide shaft 32 with interposition of an annular seal preferably placed in an annular seat of said guide shaft 32. The cup-shaped body 31 has a second portion 34 with higher radial dimensions such as to house the shutter 26 inside it. A terminal edge 35 (FIG. 3) of the second portion 34 of the cup-shaped body 31 is destined to enter into striking contact with a striking edge 30 of the cylindrical housing 8 in a radially more outer zone with respect to the striking zone of the shutter 26. The cup-shaped body 31 has a radially outer annular appendage 36 axially placed between the first portion 33 and the second portion 34. A helical spring 37 is arranged around the cup-shaped body 31 and has an axial end placed in striking contact against said annular appendage 36 and an opposite axial end in abutment against an abutment surface 38 defined between the third section 9 and the fourth section 10 of the substantially cylindrical cavity of the principal body 2a.

A rolling membrane 39 surrounds the cup-shaped body 31 and has a radially inner edge 40 sealingly constrained to said cup-shaped body 31, preferably placed in a radially outer annular seat, and a radially outer edge 41 sealingly constrained to the valve body 2, preferably closed between the principal body 2a and the auxiliary body 2b. The rolling membrane 39 delimits, together with the inner walls of the valve body 2 and precisely the auxiliary body 2b, a first chamber 42 axially placed between the cup-shaped body 31 and the auxiliary body 2b. The rolling membrane 39 also delimits, together with a radially outer surface of the cup-shaped body 31 and a radially inner surface of the principal body 2a, a second chamber 43 axially placed between said membrane 39 and the abutment surface 38. The spring 37 thus remains placed in a portion of said second chamber 43. The cup-shaped body 31 is mobile axially in an independent way from the guide shaft 14 and therefore also from the shutter 26 and from the flow shutter 18 under the action of the pressures acting in the first chamber 42 and in the second chamber 43 and of the spring 37. The cup-shaped body 31 with its axial movement is able to shut off or close the outlet port 13.

The cup-shaped body 31, the rolling membrane 39 and the spring 37 are part of a differential pressure automatic regulation device, as will be detailed below.

The shutter 26 closes an inner volume 44 of the cup-shaped body 31 which is substantially at the same pressure of the second chamber 43 because between a radially inner surface of the radially outer cylindrical wall 43 of the cup-shaped body 31 and a peripheral edge of the plate 27 a circular split 45 (FIG. 3) remains through which the liquid passes. Said inner volume of the cup-shaped body 31 is variable due to the relative motion possible between said cup-shaped body 31 and the shutter 26.

In use and with the valve open (FIGS. 2 and 4), the flow of liquid enters into the inlet 4, passes through the inlet slot 12 and the portion/s of the window/s 24 of the inlet opening of the flow shutter 18 facing said slot 12 and enters into the inner volume 22. The liquid rises axially towards the outlet opening 23 of the flow shutter 18 reaching an annular chamber delimited by the flow shutter 18, by the shutter 26 and by radially inner surfaces of the third section 9 and the second section 8 of the substantially cylindrical cavity of the principal body 2a. The principal flow of the liquid then continues towards the outlet 5 passing through the outlet port 13.

The flow rate is pre-set by rotating the flow shutter 18 by means of the driving spindle 14 in a pre-selected angular position, so that a specific number of windows 24 are facing the inlet slot 12. Rotation is performed manually by means of a regulating ring nut 51 mounted on the first end 14a of the driving spindle 14. The ring nut 51 may be reached by dismantling the actuator 3. During functioning of the valve 1, said angular position remains fixed.

The liquid in the inlet 4 is at a specific upstream pressure "P+". In passage through the flow shutter 18 and due to the resistances given both by the flow shutter 18 and by the shutter 26, the liquid suffers a drop in pressure down to a downstream pressure "P−" which is in the annular chamber 46 and substantially also at the outlet 5.

The liquid at upstream pressure "P+" is also present in the first chamber 42 because from the inlet 4 it passes into the straight channel 11, into the small chamber 7, through an axial conduit 47 afforded in the driving spindle 14, through radial passages 48 of said spindle 14, through radial passages 49 of the guide shaft 32 and through a hollow space 50 delimited between the guide shaft 32 and the cup-shaped body 31 which in turn communicates with the first chamber 42 (FIG. 3).

The liquid at downstream pressure "P−" is also present in the second chamber 43 because from the annular chamber 46 it passes into the second chamber 43 through an annular passage delimited between the cup-shaped body 31 and a radially inner surface of the principal body 2a close to the abutment surface 38. The liquid at downstream pressure "P−" is also present in the inner volume of the cup-shaped body 44 because it passes through the circular split 45.

Therefore the upstream pressure "P+" acts in the first chamber 42 on the rolling membrane 39 and on the cup-shaped body 31 and the downstream pressure "P−" acts in the second chamber 43 and in the inner volume of the cup-shaped body 44 on said cup-shaped body 31 and partly also on the membrane 39. A force on the cup-shaped body 31 corresponds with upstream pressure "P+" directed from the second end "E2" towards the first end "E1". A force on the cup-shaped body 31 corresponds with downstream pressure "P−" directed from the first end "E1" towards the second end "E2" which adds up to the force generated by the spring 37.

The equilibrium of the force generated by the upstream pressure "P+" with the one generated by the downstream pressure "P−" increased by the elastic reaction of the spring 37 changes the position of the cup-shaped body 31 and the amplitude of the outlet port 13, guaranteeing continual constancy of the flow rate automatically. In the absence of differential pressure, the spring 37 maintains the cup-shaped body 31 in the position closest to the second end "E2" and the outlet port 13 completely open.

A modulation of the flow rate may also be made, around the flow rate pre-set manually, by axially moving the driving spindle 14 by means of the actuator 3. In FIG. 2, there are windows 24 facing for their entire axial development the inlet slot 12. On the other hand, in FIG. 4 the windows 24 are shifted closer towards the first end "E1" and partially closed by the wall of the principal body 2a adjacent to the inlet slot 12. Axial movement of the spindle also determines, as visible from comparison between FIGS. 2 and 4, a variation in axial development of the annular chamber 46.

FIG. 5 shows the valve 1 closed, i.e. with the shutter 26 in abutment against the striking edge 30 of the cylindrical housing 8. Said position is maintained by the actuator 3 which pushes the spindle 14 in contrast with the principal spring 16. Without the actuator 3, the principal spring 16 maintains the valve 1 in the normally open condition with the shutter 26 distanced from the striking edge 30.

Figure 6:
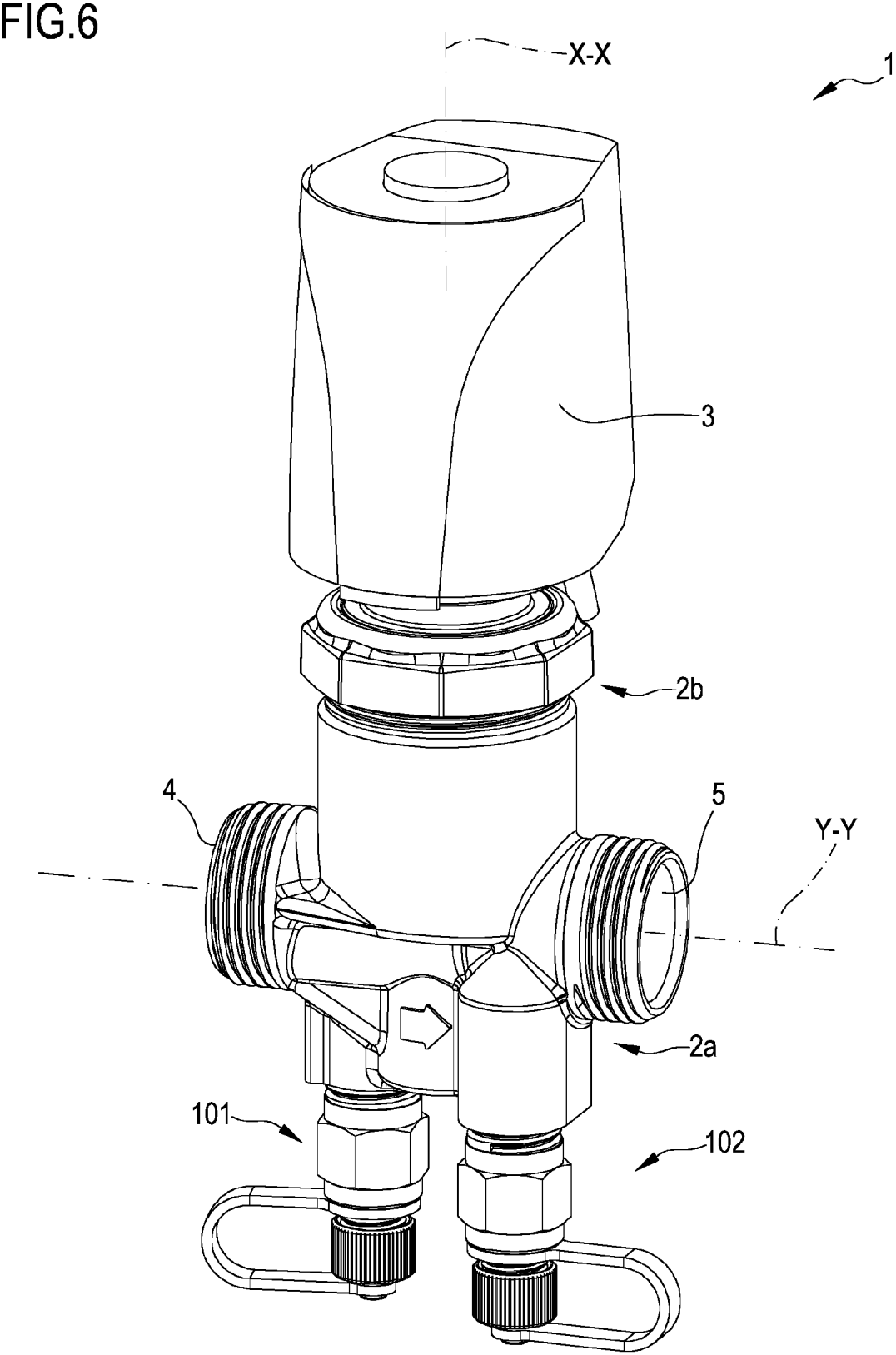
FIG. 6 shows an overall perspective view of a variant of the control valve according to the present invention.
Figure 7:
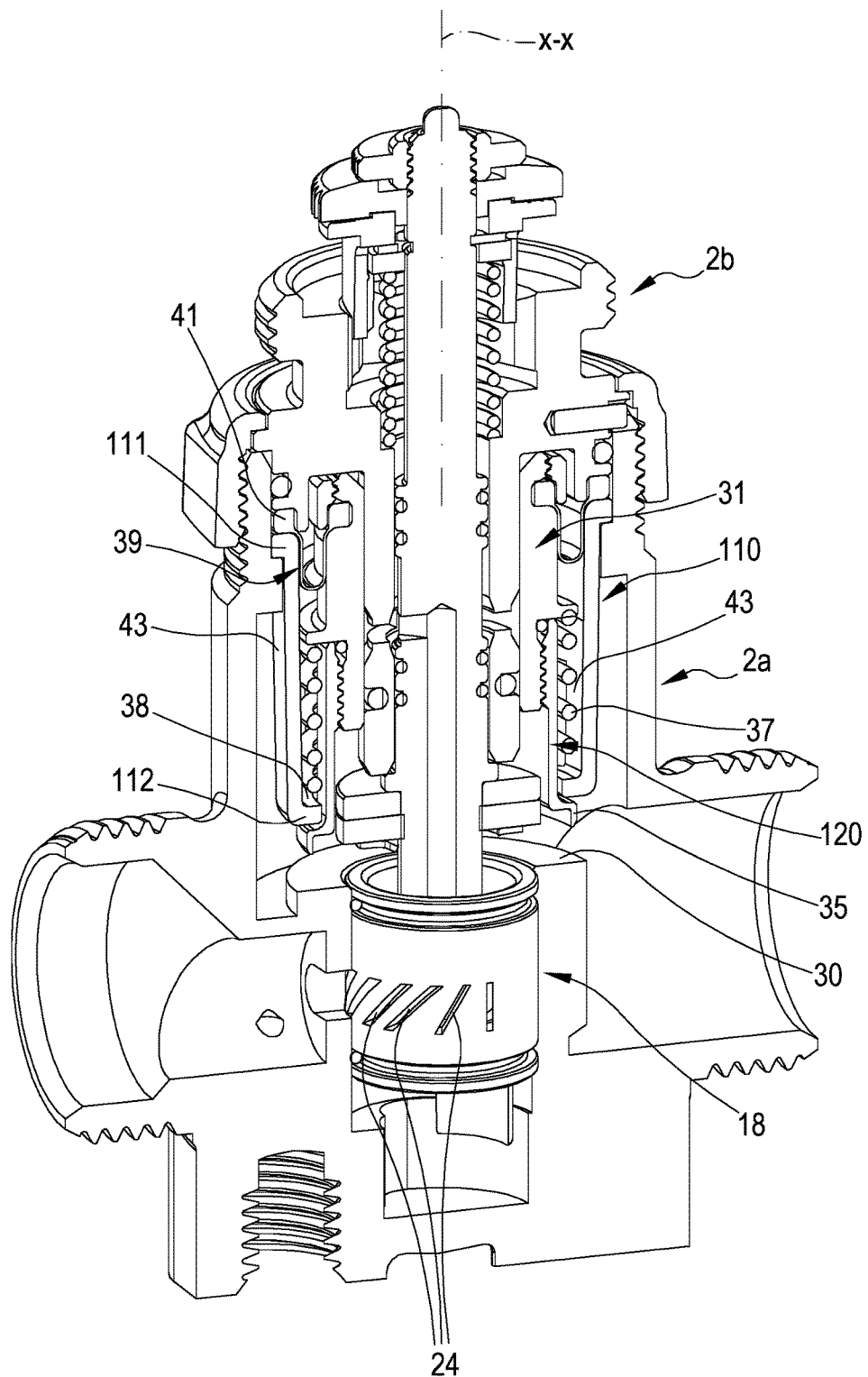
FIG. 7 shows a cross-section view of the valve of FIG. 6, with several parts removed and in an operating configuration.

FIGS. 6 and 7 show a different embodiment of the valve according to the invention. The same reference numbers already used in FIGS. 1-5 to identify corresponding elements have been used. Unlike the embodiment described above, the valve of FIG. 6 has the pressure intakes 101, 102 positioned on the opposite part of the actuator with respect to direction "Y-Y" along which are aligned the inlet 4 and the outlet 5 and are parallel to each other and also parallel to the principal axis "X-X".

Furthermore, as visible in FIG. 7, in a radially intermediate position between the cup-shaped body 31 and the principal body 2a a cylindrical body 110 coaxial to the principal axis "X-X" is positioned. An upper edge 111 of the cylindrical body 110 is closed between the auxiliary body 2b and the principal body 2a and the radially outer edge 41 of the rolling membrane 39 is sealingly constrained between said upper edge 111 and the auxiliary body 2b. With respect to the embodiment of FIGS. 1-5, the radially outer edge 41 and the overall rolling membrane 39 are shifted closer towards the first end 14a of the driving spindle 14. A lower edge 112 of the cylindrical body 110 extends radially towards the principal axis "X-X" to define the abutment surface 38 of the spring 37 which therefore, differently to the embodiment of FIGS. 1-5, does not belong to the principal body 2a. The cup-shaped body 31 is also shifted closer towards the first end 14a of the driving spindle 14 and has a lower cylindrical appendage 120 having the terminal edge 35 destined to abut against the striking edge 30.

The embodiment of FIGS. 6 and 7 also allows a greater volume of the second chamber 43 which is at discharge pressure "Pdischarge" to be obtained. The second chamber 43 is in this case radially delimited between the cup-shaped body 31 and the cylindrical body 110 and between said cylindrical body 110 and the principal body 2a.

In the embodiment of FIG. 7, the presence of the terminal edge 35 of the lower cylindrical appendage 120, which remains radially distanced from the principal body 2a, ensures that the downstream pressure "P–" in the annular chamber 46 is different to and higher than the discharge pressure "Pdischarge" at outlet 5. In the embodiment of FIGS. 6 and 7, the windows 24 are splits inclined with respect to the principal axis "X-X".

Figure 8:
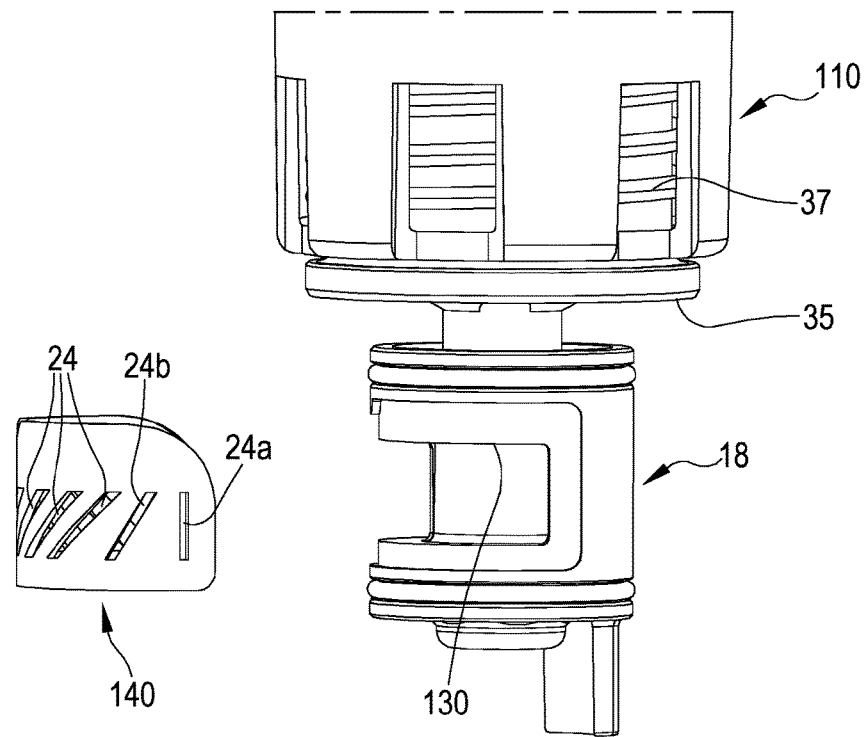
FIG. 8 shows an embodiment of an exploded detail relating to the valves of the previous figures.

FIG. 8 shows an exploded view of a variant of the flow shutter 18 of the embodiment of FIGS. 6 and 7. The radially outer cylindrical wall 19 is provided with a single wide opening 130 which extends partially around the principal axis "X-X", which is covered and closed by a sheet or band 140 (shown separate in FIG. 8). The sheet 140 has slits 24 almost all inclined. In particular, sheet 140 has a first end slit 24a parallel to the principal axis "X-X", a second slit 24b adjacent to the first slit 24a and the remaining slits 24 having all the same inclination greater than the one of the second slit 24b. Slits 24a, 24b, 24 are afforded in the sheet 140, for example by means of photo-engraving and/or laser, and then said sheet 140 is applied onto the opening 130.

Figure 9:
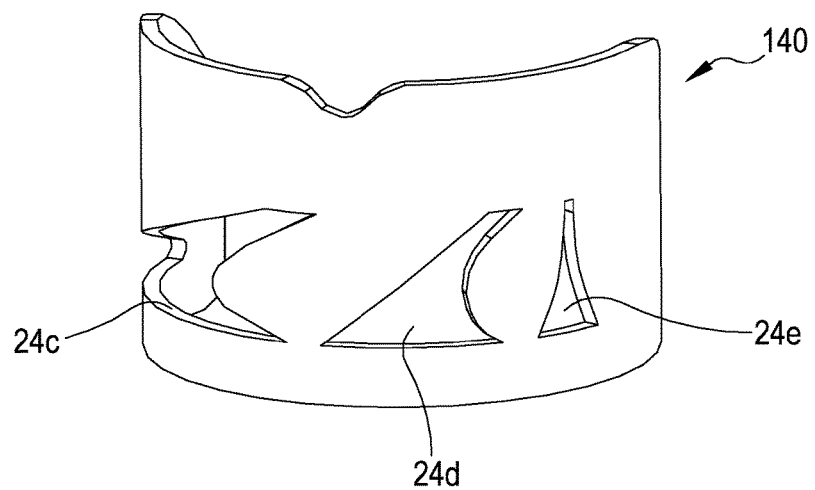
FIG. 9 shows a variant of an element shown in FIG. 8.

FIG. 9 shows a variant of the sheet 140 wherein the windows 24c, 24d, 24e are shaped to give the flow shutter 18 an equal-percentage characteristic both in rotation and in translation.

Figure 10:
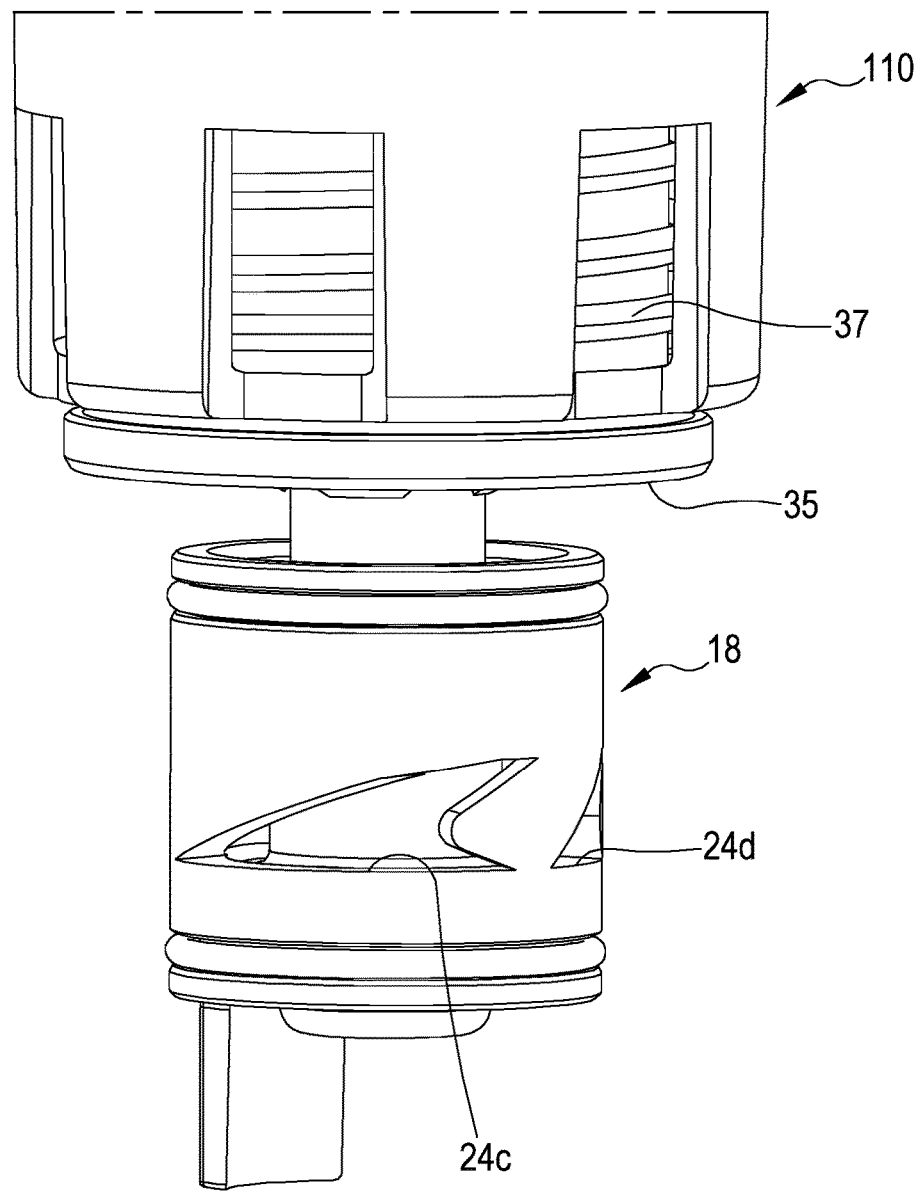
FIG. 10 shows a different embodiment of the detail of FIG. 8.

FIG. 10 shows a further variant of the flow shutter 18, wherein said flow shutter 18 is a single piece (like the one shown in FIGS. 1-5, without distinction between the sheet and the rest of the body), but the windows 24 are shaped as in FIG. 9.

In a further embodiment not shown, the flow shutter 18 is a single piece and the windows 24 are inclined slits as in FIG. 7.

Windows 24c, 24d, 24e of FIGS. 9 and 10 comprise a first window 24c (visible in both FIGS. 9 and 10) elongated along a circumferential direction and having a substantially arrow-shaped outline which ends at an end with a single top and at an opposite end with two tops axially distanced from each other. A second window 24d (more visible in FIG. 9) is alongside the first window 24c and also has a substantially arrow-shaped outline, but with lower passage area and circumferential extension with respect to the first window 24c. A third window 24d (more visible in FIG. 9) is alongside the second window 24d and has a substantially isosceles triangular outline with the base which develops along a circumferential direction.

LIST OF ELEMENTS

| | |
|---|---|
| 1 | Control valve |
| 2 | Valve body |
| E1 | First axial end of the valve body |
| E2 | Second axial end of the valve body |
| 2a | Principal body |
| 2b | Auxiliary body |
| X-X | Principal axis of the valve body |
| 3 | Actuator |
| 4 | Inlet |
| 5 | Outlet |
| Y-Y | Flow direction |
| 6 | Axial passage |
| 7 | First section/small chamber |
| 8 | Second section/cylindrical housing |
| 9 | Third section/cylindrical seat |
| 10 | Fourth section/cylindrical seat |
| 11 | Straight channel |
| 12 | Inlet slot |
| 13 | Outlet port |
| 14 | Driving spindle |
| 14a | First end of the driving spindle |
| 14b | Second end of the driving spindle |
| 15 | Volume |
| 16 | Principal spring |
| 17 | Ring |
| 18 | Flow shutter |
| 19 | Radially outer cylindrical wall |
| 20 | Radially inner cylindrical wall |
| 21 | Base wall |
| 22 | Inner volume |
| 23 | Outlet opening |
| 24 | Inlet opening |
| 25 | Appendage/rotation limiter |
| 26 | Shutter |
| 27 | Plate |
| 28 | Shaped portion |
| 29 | Radially peripheral edge |
| 30 | Striking edge |
| 31 | Cup-shaped body |
| 32 | Guide shaft |
| 33 | First portion |
| 34 | Second portion |
| 35 | Terminal edge |
| 36 | Annular appendage |
| 37 | Spring |
| 38 | Abutment surface |
| 39 | Rolling membrane |
| 40 | Radially inner edge |
| 41 | Radially outer edge |
| 42 | First chamber |
| 43 | Second chamber |
| 44 | Inner volume of the cup-shaped body |
| 45 | Circular split |
| 46 | Annular chamber |
| 47 | Axial conduit |
| 48 | Spindle radial passages |
| 49 | Guide shaft radial passages |
| 50 | Hollow space |
| 51 | Regulation ring nut |
| 101 | First pressure intake |
| 102 | Second pressure intake |
| 110 | Cylindrical body |
| 111 | Upper edge of the cylindrical body |
| 112 | Lower edge of the cylindrical body |
| 120 | Lower cylindrical appendage of the cup-shaped body |
| 130 | Wide opening of the radially outer cylindrical wall |
| 140 | Sheet or band |
| 24a | First slit |
| 24b | Second slit |
| 24c | First window |
| 24d | Second window |
| 24e | Third window |

The invention claimed is:
1. A control valve comprising:
a valve body including an inlet and an outlet;

a flow shutter operatively interposed between the inlet and the outlet, the flow shutter including a radially outer cylindrical wall, a radially inner cylindrical wall and an annular-shaped base wall connecting the radially outer and radially inner cylindrical walls, wherein an inner volume is formed between the radially outer and inner cylindrical walls, the inner volume is closed at one end by the base wall and the inner volume opens to an outlet at an end of the flow shutter opposite to the base wall;

a driving spindle including a first actuating end and a second end opposite the first actuating end, and connected to the flow shutter, wherein the driving spindle extends along a principal axis of the control valve; and a differential pressure automatic regulation device including:
  a cup-shaped body around the driving spindle and axially mobile with respect to said driving spindle;
  a spring operatively interposed between the valve body and the cup-shaped body, and configured to push said cup-shaped body away from the flow shutter;
  a rolling membrane including a radially inner edge fixed to the cup-shaped body and a radially outer edge fixed to the valve body to delimit a first chamber in fluid communication with the inlet and a second chamber in fluid communication with the outlet;

wherein the flow shutter includes at least one inlet opening facing the inlet of the valve body and wherein the outlet opening faces the cup-shaped body;

wherein the valve comprises a shutter mounted around the driving spindle and facing towards the outlet opening of the flow shutter; wherein the shutter and the flow shutter delimit between them a substantially toroidal volume towards which the outlet opening of the flow shutter opens;

wherein an axial distance between the shutter and the outlet opening of the flow shutter is fixed;

wherein the flow from the inlet enters into the inlet opening of the flow shutter along a substantially radial direction and exits through the outlet opening of said flow shutter along a substantially axial direction to then transit towards the outlet of the valve along a substantially radial direction.

2. The valve according to claim 1, further comprising a guide shaft having an axial passage for the driving spindle, wherein the cup-shaped body is mounted around said guide shaft.

3. The valve according to claim 2, wherein the guide shaft is fixed with respect to the valve body.

4. The valve according to claim 1, wherein the spring is arranged around the cup-shaped body.

5. The valve according to claim 1, wherein, in at least one operating condition of the open valve, the flow shutter and the shutter delimit between them an annular chamber communicating laterally with the outlet of the valve body.

6. The valve according to claim 5, wherein the spring is axially offset with respect to the annular chamber and the spring is configured to not obstruct the flow.

7. The valve according to claim 1, wherein the valve body has a cylindrical housing configured for the flow shutter, wherein the valve body has an outlet port between the annular chamber and the outlet, and wherein the cup-shaped body, with its axial motion, shuts off said outlet port, and wherein the cylindrical housing has a striking edge configured to receive in abutment a terminal edge of the cup-shaped body to close the outlet port of the valve body.

8. The valve according to claim 1, wherein the valve body has a cylindrical housing configured for the flow shutter and wherein the cylindrical housing has a striking edge configured to receive in abutment, while the valve is closed, a peripheral edge of the shutter.

9. The valve according to claim 1, wherein, while the valve is closed, the shutter blocks a flow outgoing from the outlet opening of the flow shutter.

10. The valve according to claim 1, wherein the shutter is at least partially housed in the cup-shaped body.

11. The valve according to claim 1, wherein the shutter is solidly constrained with the driving spindle in rotation motion and in axial movement and wherein the flow shutter is solidly constrained with the driving spindle in the rotation motion and in the axial movement.

12. The valve according to claim 1, wherein an inlet slot is on the valve body between the inlet and the flow shutter.

13. The valve according to claim 12, wherein the flow shutter is rotatable in the valve body on action of the driving spindle and is axially mobile in the valve body on action of the driving spindle to change the position of its inlet opening with respect to the inlet slot.

14. The valve according to claim 1, wherein the inlet opening of the flow shutter includes at least one window.

15. The valve according to claim 13, wherein the flow shutter includes a rotation limiter cooperating with the valve body, wherein the rotation limiter is an appendage of the flow shutter inserted in a small chamber in the valve body.

16. The valve according to claim 1, wherein the flow shutter comprises a single wide opening covered by a sheet, wherein the sheet includes a plurality of windows.

17. The valve according to claim 14, wherein said at least one window is at least one slit inclined with respect to the principal axis of the control valve.

18. The valve according to claim 14, wherein said at least one window has a substantially arrow-shaped outline.

19. A control valve comprising:
  a valve body including an inlet and an outlet;
  a flow shutter operatively interposed between the inlet and the outlet;
  a driving spindle including a first actuating end and a second end opposite the first end, and connected to the flow shutter, wherein the driving spindle extends along a principal axis of the control valve; and
  a differential pressure automatic regulation device including:
    a cup-shaped body around the driving spindle and axially mobile with respect to said driving spindle;
    a spring operatively interposed between the valve body and the cup-shaped body, and configured to push said cup-shaped body away from the flow shutter;
    a rolling membrane including a radially inner edge fixed to the cup-shaped body and a radially outer edge fixed to the valve body to delimit a first chamber in fluid communication with the inlet and a second chamber in fluid communication with the outlet;

wherein the flow shutter includes at least one inlet opening arranged radial to the driving spindle and facing the inlet of the valve body and at least one outlet opening axially towards the cup-shaped body;

wherein the valve comprises a shutter mounted around the driving spindle axially spaced from the at least one outlet, and the shutter facing towards the outlet opening of the flow shutter;

wherein the flow from the inlet enters into the inlet opening of the flow shutter along a substantially radial direction and exits through the outlet opening of said flow shutter along a substantially axial direction to then transit towards the outlet of the valve along a substantially radial direction;

wherein, in at least one operating condition of the open valve, an annular chamber is formed between the at least one outlet of the flow shutter and the shutter of the valve, and the annular chamber communicates fluid laterally with the outlet of the valve body;

wherein the spring is axially offset with respect to the annular chamber and does not extend into the annular chamber.

20. A control valve comprising:

a valve body including an inlet and an outlet;

a flow shutter operatively interposed between the inlet and the outlet;

a driving spindle including a first actuating end and a second end opposite the first end, and connected to the flow shutter, wherein the driving spindle extends along a principal axis of the control valve; and a differential pressure automatic regulation device including:

a cup-shaped body around the driving spindle and axially mobile with respect to said driving spindle;

a spring operatively interposed between the valve body and the cup-shaped body, and configured to push said cup-shaped body away from the flow shutter;

a rolling membrane including a radially inner edge fixed to the cup-shaped body and a radially outer edge fixed to the valve body to delimit a first chamber in fluid communication with the inlet and a second chamber in fluid communication with the outlet;

wherein the flow shutter includes at least one inlet opening facing the inlet of the valve body and at least one outlet opening facing the cup-shaped body;

wherein the valve comprises a shutter mounted around the driving spindle and facing the outlet opening of the flow shutter;

wherein the at least one inlet opening in the flow shutter is configured to allow flow from the inlet to enter into the inlet opening along a substantially radial direction;

wherein the outlet opening of the flow shutter and the shutter of the valve are arranged to allow flow to exit the flow shutter along a substantially axial direction and to then transit towards the outlet of the valve along a substantially radial direction;

wherein the flow shutter is rotatable in the valve body on action of the driving spindle;

wherein the flow shutter includes a rotation limiter cooperating with the valve body; and wherein the rotation limiter comprises an appendage developing axially from a radial edge close to a base wall of the flow shutter and remains in a small chamber;

wherein the appendage interferes with a non-circular shaped wall delimiting the small chamber.

* * * * *